Sept. 1, 1964  S. R. PETOIA  3,146,974
PENDANT SUPPORT

Filed Dec. 27, 1962  3 Sheets-Sheet 1

INVENTOR.
SALVATORE ROBERT PETOIA
BY
Arthur M. Bolline
ATTORNEY

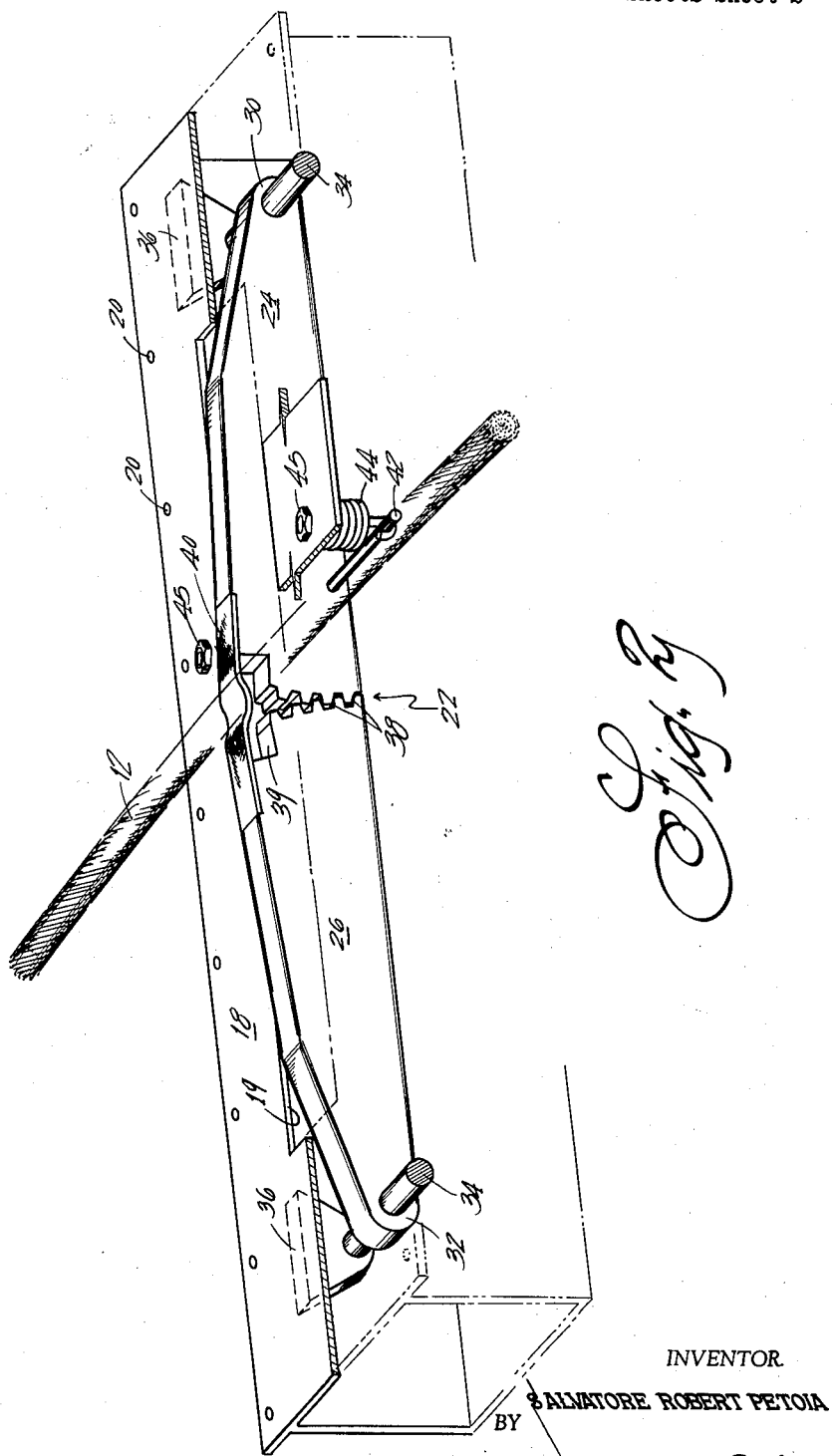

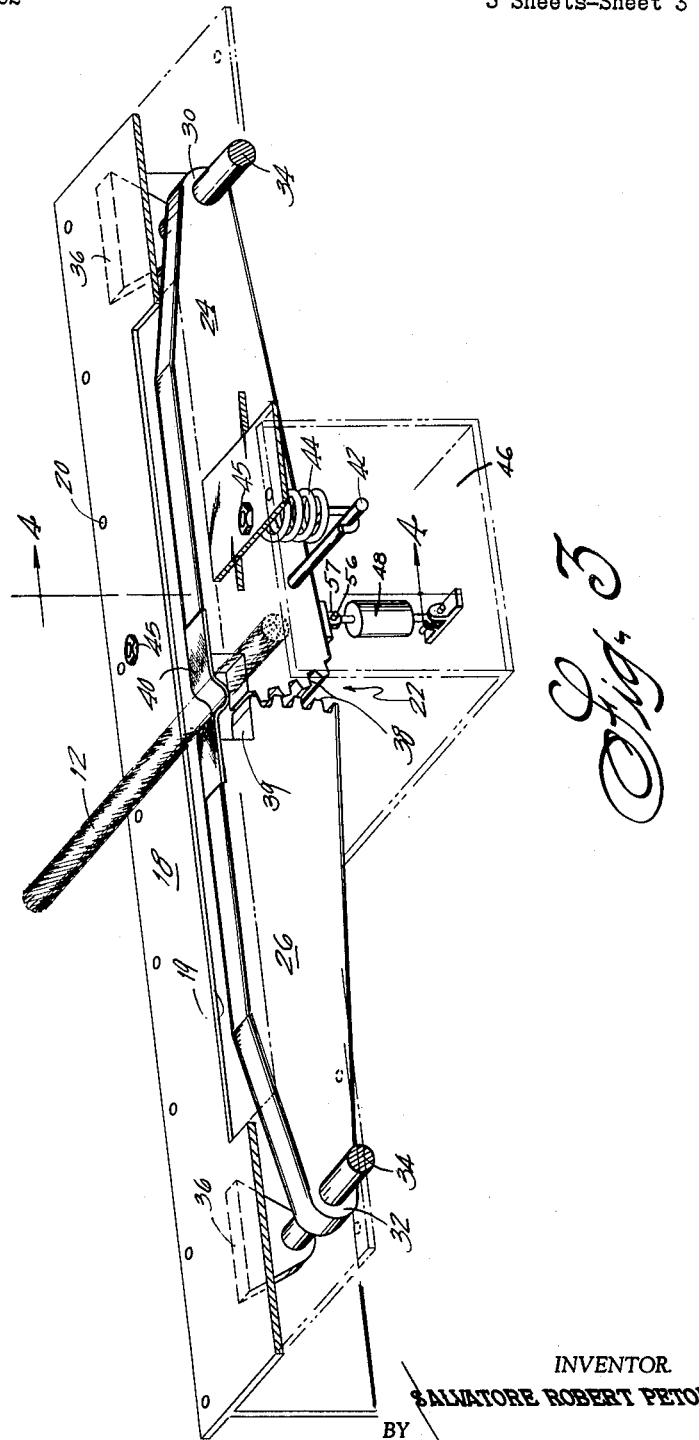

3,146,974
PENDANT SUPPORT
Salvatore R. Petoia, 50 Columbus Ave., Belleville, N.J.
Filed Dec. 27, 1962, Ser. No. 247,771
3 Claims. (Cl. 244—110)
(Granted under Title 35, U.S. Code (1952), sec. 266)

The invention described herein may be manufactured and used by or for the Government of the United States of America for governmental purposes without the payment of any royalties thereon or therefor.

This invention relates to supports and particularly to the type used for holding an aircraft arresting pendant at a required elevation above a landing surface.

In stopping an aircraft making a landing in a limited distance, it is common to stretch a cable, that is, a pendant, across the runway and engage it with a hook suspended from the aircraft. The span of the pendant is substantial and unless the pendant is supported at numerous points, it lies on the landing surface and cannot be readily grabbed by an aircraft arresting hook. On the other hand, a pendant that is raised above the landing surface, although it is satisfactory for arrestments, is an obstruction to traffic on the landing surface.

An object of this invention is to provide a support that is adapted to raise or lower a pendant, that will yield to excessive loads, such as a taxiing aircraft running over it, and that is rugged and readily installed.

Other objects and features of the invention will be apparent upon reading the following description in connection with the accompanying drawing, wherein:

FIG. 2 is a sectional view along line 2—2 of FIG. 1 showing one of the supports in side elevation with parts broken away or removed and in its raised position;

FIG. 3 is similar to FIG. 2 but shows the support in a lowered position and also the supported actuator by which it is lowered;

Figure 1:
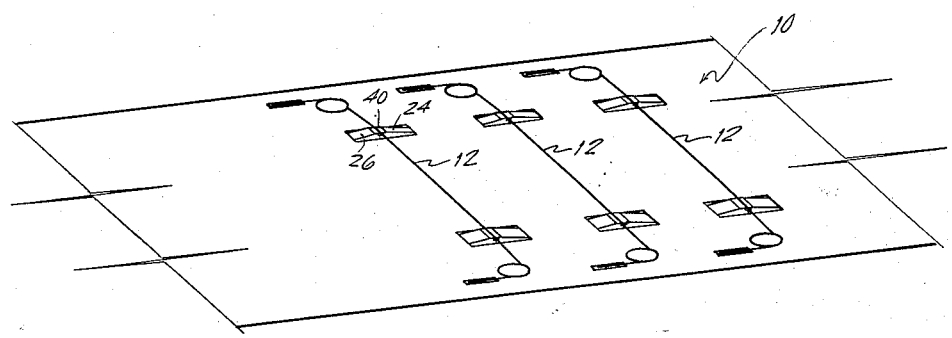
FIG. 1 is a plan view of a portion of a landing surface with a pendant supported by supports constructed in accordance with the invention.

Referring to the drawing, 10 indicates a part of a landing surface, for instance, a landing field runway, having a pendant 12 extending across it. Pendant 12 is a wire cable secured to an energy absorber, not shown, disposed to the side of the runway for halting its translatory movement as would be caused by engagement of it with an arresting hook on a landing aircraft. The landing surface 10 is provided with a series of laterally and rectangularly shaped openings 14 (FIG. 4) under pendant 12. Mounted in these openings 14 are supports 16 embodying the invention by which the pendant 12 is raised and lowered as required in making aircraft arrestments.

Each support 16 includes a metallic plate 18, having a longitudinal slot 19, which covers opening 14 and is secured to the landing surface 10 by bolts 20. The landing surface is rabbeted around the opening 14 to receive the edge portion of plate 18 so that the plate's upper surface is flush with the landing surface.

Within slot 19 of plate 18 there is a beam 22 composed of two axially aligned rigid members or levers 24 and 26. The far ends, 30 and 32, of levers 24 and 26 respectively are pivotally mounted on shafts 34 that are carried by bearings 36 secured to the under surface of plate 18 at the ends of slot 19. The opposed ends of levers 24 and 26 are curved, in a vertical plane, in effect they are sectors of circles having the shafts 34 as centers of curvature, and are provided with meshing gear teeth 38. This construction permits the levers, 24 and 26, to rotate in a vertical plane on the gear teeth 38, while pivoting at their far ends, so that the center of the beam 22 is raised above or lowered below the plate 18. The upper end portions on the geared ends of levers 24 and 26 are cut away as shown at 39. A flexible member 40 in the form of a wire mesh is secured, as by welds, not shown, to the upper surface of the levers 24 and 26 and across the joint between the levers, which is adapted to carry pendant 12. The length of mesh 40 is such that it will not prevent upward movement of levers 24 and 26. When the levers are lowered, as in FIG. 3, mesh 40 is longer than the cut out it spans and its center portion sags into the cut outs 39.

Figure 4:
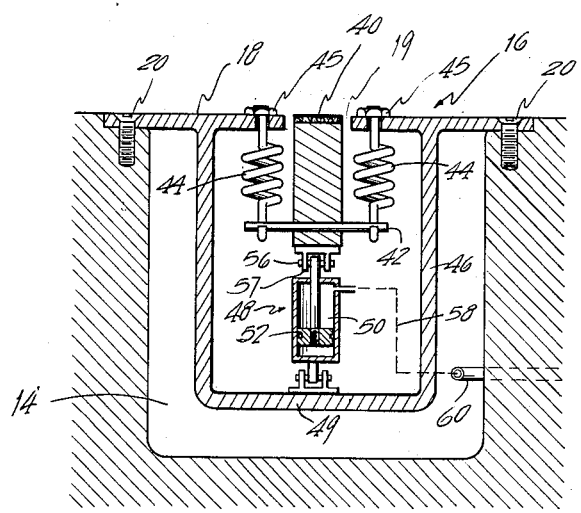
FIG. 4 is a sectional view taken along 4—4 of FIG. 3.

In order to raise beam 22 by pivoting its lever members, one lever, 24, has a cross-bar 42 passing through and secured to it near its geared end. The ends of the cross-bar 42 extend beyond the sides of the lever 24. A spring 44 depending from plate 18 by having its upper end project through the plate and carrying a nut 45 is connected at its other end to cross-bar 42. The resilience of spring 44 is sufficient to pull lever 24 upwardly so that its geared end projects above the landing surface 10 the requisite amount for holding pendant 12 at its desired height as shown in FIG. 2. Since lever 26 is geared to lever 24, moving the latter causes lever 26 to move similarly. In FIG. 4, two springs, 44, are shown for elevating the levers; however, only one spring may be utilized if so desired. Likewise, the other lever, 26, may also be furnished with similar resilient elevating elements.

Spring 44 normally holds beam 22, and pendant 12 thereby, in its "up" or raised position, as in FIG. 2. To lower the pendant, as shown in FIG. 3, levers 24 and 26 are rotated downwardly. This is achieved by applying a pulling force to one of the levers which overcomes the upward pull of springs 44. For this purpose, a U-type support strap 46 is secured to the under surface of plate 18 so that its legs are disposed on either side of lever 24. An actuator 48 is pivotally secured to the cross member 49 of strap 46 which has a cylinder 50 with a piston 52 having a piston rod 54 projecting through the cylinder. The free end of piston rod 54 is pivotally connected by a pin 56 carried in a bracket 57 secured to the under side of lever 24. A conduit 58 from a supply line 60 is connected to the upper end of cylinder 50. Supply line 60 extends in a direction parallel to pendant 12 but under the landing surface and through the openings 14 and is connected to a valved supply of fluid pressure not shown.

In the operation, admitting fluid pressure into cylinder 50 forces piston 52 downwardly, whereby levers 24 and 26 are thereby pivoted to the down position of FIG. 2. Venting supply line 60 evacuates cylinder 50 above piston 52 whereupon the force of springs 44 pulls levers 24 and 26 upwardly to the position of FIG. 3. When the levers 24 and 26 are pivoted to project above the landing surface as in FIG. 3, pendant 12 is raised to the required elevation for aircraft arrestments. Should an excessive load be placed on the support 16 while in its "up" position, it will be depressed to the level of the landing surface. After the load has been removed, the springs 44 will again pull the levers upwardly and raise the pendant, until fluid pressure is admitted into actuator 48.

Since the far ends of levers 24 and 26 are pivoted beneath the landing surface 10, when the beam is in the "up" position, as in FIG. 3, there is an inclination from either direction that is conducive to negotation by wheeled vehicles moving over the support in the direction of the runway. And because the levers 24 and 26 depress to the level of the landing surface, there is a limit to the load that can be placed on them, as by a rolling vehicle. Once the levers are depressed, plate 18 carries the load of the vehicle. For this reason, levers 24 and 26 need not be extremely rugged.

Obviously many modifications and variations of the present invention are possible in light of the above teachings. It is therefore to be understood that within the scope of the appended claims, the invention may be practiced otherwise than as specifically described.

What is claimed is:

1. A support for holding an aircraft arresting pendant at a predetermined height above a landing surface comprising:
    (a) a pair of axially aligned rigid members adapted to be disposed under and transversely to said pendant on said landing surface, the far ends of said members being adapted to be fixed to said landing surface for vertical pivoting relative thereto;
    (b) gear means joining the near ends of said members for causing movement of one of said members in a vertical plane by similar movement of the other;
    (c) yielding means secured to a member and adapted to be secured to said landing surface for normally urging said members upwardly whereby said pendant is raised above said landing surface and means connected to one of said members for applying a downward force to cause lowering of said rigid members thereby.

2. A support for an aircraft arresting pendant extending across a landing surface comprising:
    (a) a plate adapted to be supported by said surface and having a slot extending transversely to said pendant;
    (b) a pair of abutting, axially aligned rigid members disposed in said slot and pivotally secured at their far ends to said plate for pivotal movement in a vertical plane and against movement in a horizontal plane;
    (c) meshing gear means joining the near ends of said members for causing movement of one of said members in a vertical plane by similar movement of the other;
    (d) spring means connected to one of said members and said plate urging said members upwardly to project at their near ends above said plate and raise said pendant thereby, a support secured to the underside of said plate and under one of said rigid members, and an actuator connected to said support and one of said rigid members for applying a downward force to said one rigid member and lowering said pendant thereby.

3. In an aircraft landing surface having a pendant extending transversely thereof and having an opening under said pendant, a support comprising:
    (a) a plate covering said opening and having a slot extending transversely of said pendant;
    (b) a pair of abutting, axially aligned rigid members disposed in said slot;
    (c) means at the far ends of said members pivotally securing them to said plate;
    (d) meshed gear sectors integrated on the near ends of said members and disposed in a vertical plane to cause vertical movement of one of said members with similar movement of the other by a downward or upward force on the other;
    (e) spring means secured at one end to said plate and the other end to one of said members near its near end urging thereof upwardly above said plate thereat;
    (f) support means secured to the under side of said plate;
    (g) and an actuator secured to said support and connected to one of said members for movement thereof in a downward direction.

References Cited in the file of this patent
UNITED STATES PATENTS
2,777,653    Cotton et al. _____ Jan. 15, 1957